United States Patent
Froelich et al.

(10) Patent No.: US 7,907,530 B2
(45) Date of Patent: Mar. 15, 2011

(54) DETERMINING LINK COSTS

(75) Inventors: Stephen F Froelich, Corvallis, OR (US);
Lloyd E Wright, Albany, OR (US);
Michael J Uppendahl, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 11/917,649

(22) PCT Filed: Sep. 20, 2007

(86) PCT No.: PCT/US2007/079049
§ 371 (c)(1),
(2), (4) Date: Sep. 26, 2008

(87) PCT Pub. No.: WO2009/038582
PCT Pub. Date: Mar. 26, 2009

(65) Prior Publication Data
US 2009/0316582 A1 Dec. 24, 2009

(51) Int. Cl.
H04L 12/28 (2006.01)

(52) U.S. Cl. ............... 370/238.1; 709/241

(58) Field of Classification Search .......... None
See application file for complete search history.

(56) References Cited

U.S. PATENT DOCUMENTS

| | | | |
|---|---|---|---|
| 6,122,514 A | 9/2000 | Spaur et al. | |
| 6,633,544 B1 | 10/2003 | Rexford et al. | |
| 6,658,479 B1 * | 12/2003 | Zaumen et al. | 709/238 |
| 6,762,997 B1 | 7/2004 | Liu et al. | |
| 7,161,957 B2 * | 1/2007 | Wang et al. | 370/468 |
| 7,500,013 B2 * | 3/2009 | Dziong et al. | 709/238 |
| 7,526,570 B2 * | 4/2009 | Rooholamini et al. | 709/241 |
| 2004/0233850 A1 | 11/2004 | Randriamasy | |
| 2005/0265359 A1 | 12/2005 | Drew et al. | |
| 2006/0080463 A1 | 4/2006 | Drew et al. | |
| 2006/0209701 A1 | 9/2006 | Zhang et al. | |
| 2006/0250965 A1 | 11/2006 | Irwin | |
| 2007/0025254 A1 | 2/2007 | Raciborski et al. | |
| 2007/0230363 A1 * | 10/2007 | Buskens et al. | 370/252 |

OTHER PUBLICATIONS

Cisco IGRP Metric, http://www.cisco.com/warp/public/103/3.html, year 2005.
International Standard ISO/IEC 10589, http://standards.iso.org/ittf/PubliclyAvailableStandards/c030932_ISO_ IEC_10589_ 2002(E).zip, year 2002.
Multiple Metrics for Traffic Engineering with IS-IS and OSPF, Fedyk et al, http://tools.ietf.org/html/draft-fedyk-isis-ospf-te-metrics-01, year 2000.
The International Search Report and the Written Opinion of the International Searching Authority for International Application No. PCT/US2007/079049 dated Jun. 13, 2008, pp. 15.

* cited by examiner

*Primary Examiner* — Kwang B Yao
*Assistant Examiner* — Alex Skripnikov

(57) ABSTRACT

Embodiments of a system with a first network device and at least first and second links connecting the first network device and one or more other network devices are disclosed. The first network device determines the costs of the first and the second links using the latencies of the first and the second links and factors that correspond to the bandwidths of the first and the second links.

16 Claims, 2 Drawing Sheets

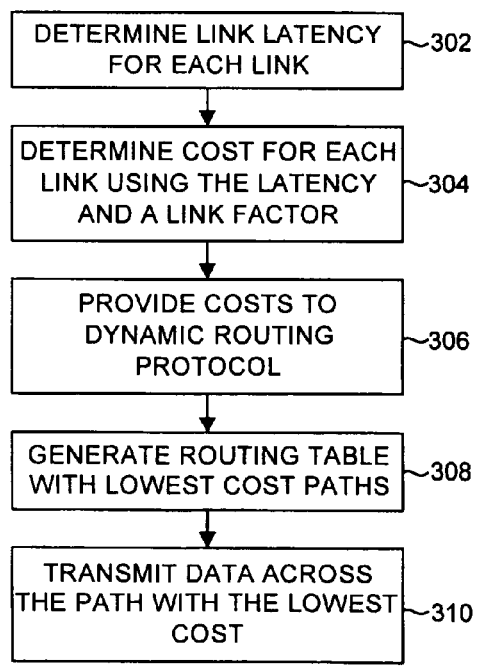
Fig. 2A
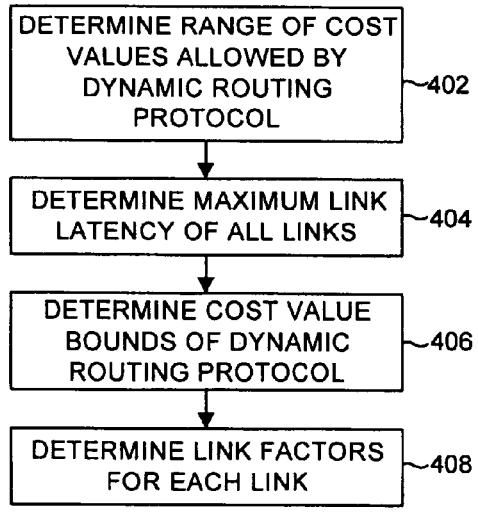
Fig. 2B
Fig. 3
Fig. 4

DETERMINING LINK COSTS

BACKGROUND

Communication networks may include communications paths between network devices that have different properties, such as capacities and latencies, for transmitting data between the devices. To transmit data as efficiently as possible between network devices in a network, network devices often consider various capabilities of the communication paths. These considerations, however, can quickly become overly complex and difficult to implement and may have the unintended effect of making the network operate less efficiently. To avoid this possibility, a routing scheme that involves simple, straightforward, and consistent application of routing preferences by network devices would be desirable.

BRIEF DESCRIPTION OF THE DRAWINGS

FIGS. 2A-2B are tables illustrating embodiments of link factors.

FIG. 3 is a flow chart illustrating an embodiment of a method for transmitting data across a lowest cost communications path.

FIG. 4 is a flow chart illustrating an embodiment of a method for determining link factors for communications links.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

According to one embodiment, a communications network with network devices is provided. The network devices are configured to transmit data, such as media data, on communications paths with the lowest costs where each path includes one or more communication links. The cost of each link in each path is determined from the latency of the link and a factor that is inversely related to the bandwidth of the link. The cost of each path is determined from the costs of each link in the path.

Figure 1A:
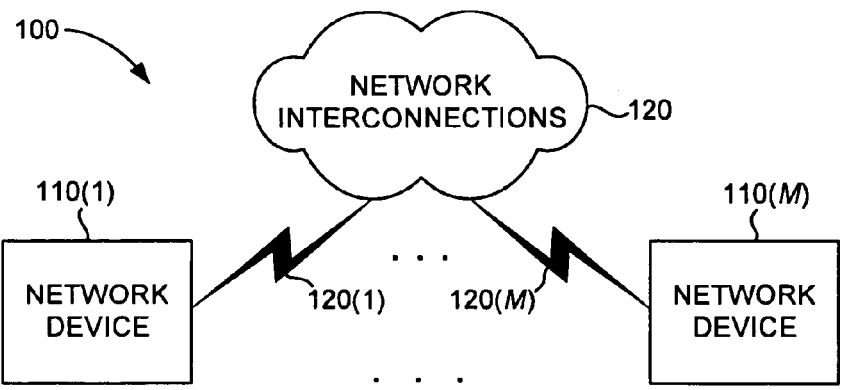
FIGS. 1A-1C are block diagrams illustrating an embodiment of a communications network with network devices connected with network interconnections.
Figure 1B:
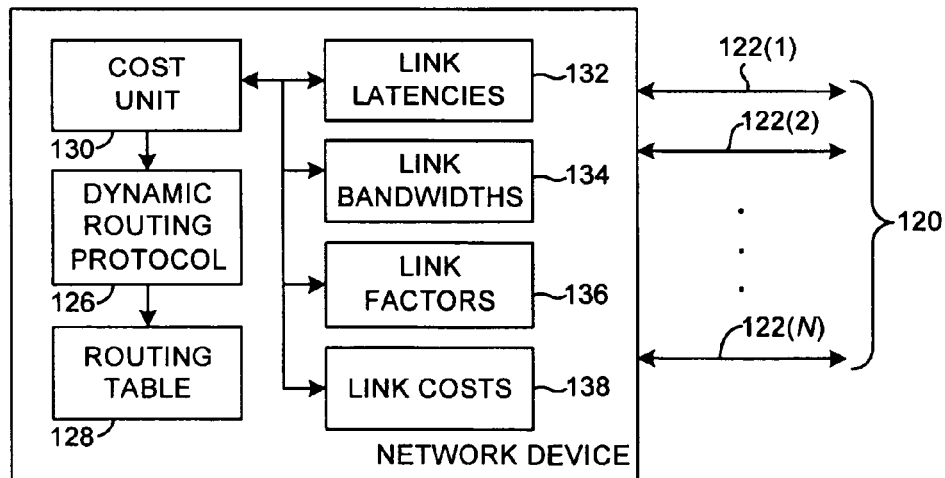
Figure 1C:
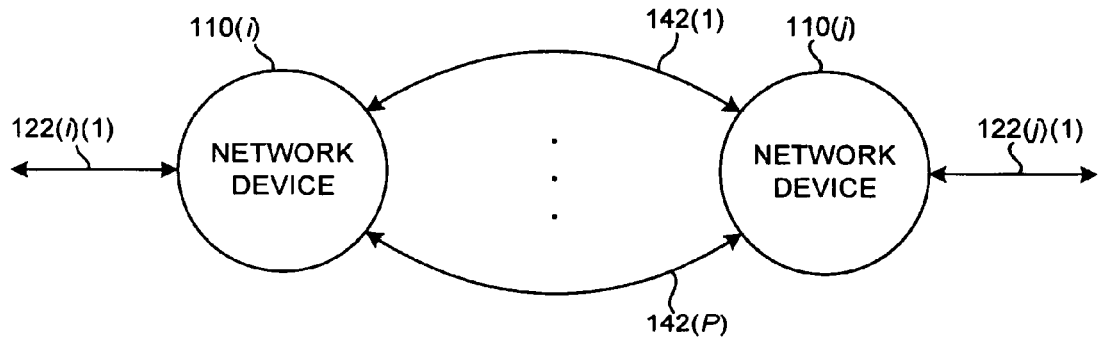

FIGS. 1A-1C are block diagrams illustrating an embodiment of a communications network 100 with network devices 110(1)-110(M), where M is greater than or equal to two, connected with network interconnections 120.

Referring to FIG. 1A, network interconnections 120 include sets of communication links 120(1)-120(M) that connect network devices 110(1)-110(M), respectively, to network 100. Each set of communication links 120 includes communication links 122 (shown in FIG. 1B) that connect each network device 110 with other network devices 110.

Network 100 includes any suitable type and number of network devices 110 with any suitable type and number of communications links 122 connected to each network device 110. Network devices 110 may be grouped or arranged into any suitable network configuration. The network configuration may include one or more local area networks (LANs) and/or one or more wide area networks (WANs), for example, that may be locally, regionally, or globally distributed. Each network device 110 may be located in close proximity to one or more other network devices 110 and/or remotely located from one or more other network devices 110.

Network devices 110 are each configured to communicate with other network devices 110 and/or data processing systems (not shown). Each network device 110 receives data from a network device 110 and/or a data processing system over a communication link 120 and transmits the data to at least one other network device 110 and/or at least one data processing system over another communication link 120. Each network device 110 may be any suitable type of network device configured to communicate with data processing systems or other network devices 110. Examples of a network device include a wired or wireless network component in a data processing system (e.g., an audio/visual (A/V) device, a portable or non-portable computer system, a personal digital assistant (PDA), a mobile telephone, a printer, or a scanner), a router, a switch, a gateway, a firewall, and a bridge.

In one embodiment, the data that is transmitted and received by network devices 110 may be latency sensitive, constant bandwidth data streams that include audio and/or video (A/V) media exchanged between two or more video conference sites (not shown) connected to network 100. In other embodiments, the data may be any other suitable type of data.

Referring to FIG. 1B, each set of communication links 120 includes communication links 122(1)-122(N) where N is greater than or equal to one and may be the same or different for each network device 110. Each link 122 may be any suitable wired or wireless transmission link that allows communication between connected network devices 110 and/or data processing systems. Each link 122 may be formed from any suitable transmission medium (e.g., optical fiber, copper, and free space) and may transmit data using any suitable transmission protocol. In one embodiment, each link 122 is an optical link over fiber or free space configured to transmit light signals between network devices 110. In other embodiments, each link 122 includes any suitable combination of one or more wired and/or wireless links configured to transmit electromagnetic signals between network devices 110.

Each link 122 has a bandwidth that describes how much data may be transmitted between connected network devices 110 over a time period and a latency that describes the amount of time to transfer data between connected network devices 110. The latency of each link 122 may depend on a physical distance between the connected network devices 110. For example, links 122 that span longer physical distances between connected network devices 110 may generally have longer latencies than links 122 that span shorter physical distances between connected network devices 110.

Network devices 110 each implement a dynamic routing protocol 126 that generates a routing table 128 or other suitable routing information that is used to route data through network 100. With a dynamic routing protocol, network devices 110 provide information about network 100 to other network devices 110. The information includes link costs 138 determined by a cost unit 130 for links 122. Routing protocol 126 generates routing table 128 from the costs 138 and other exchanged information and uses routing table 128 to efficiently route data through network 100. In one embodiment, network devices 110 implement the Open Shortest Path First (OSPF) protocol. In other embodiments, network devices 110 implement other dynamic routing protocols.

Network devices 110 each include a cost unit 130 that is configured to determine link costs 138 of links 122 from link latencies 132 and link factors 136 that correspond to link bandwidths 134 of links 122. To determine respective costs 138 of respective links 122, cost unit 130 applies respective factors 136 to respective latencies 132 using any suitable function, such as a multiplicative or additive function. Link factors 136 are inversely related to bandwidths 134 so that the determined costs favor bandwidths 134 over latencies 132 to a point but begin to favor latencies 132 over bandwidths 134 after the point.

FIG. 2A is a table illustrating an embodiment of a set of link factors 136 for various links 122 for a network device 110 in a wide area network (WAN) configuration. In the table of FIG. 2A, link bandwidths range from 45 Mbps (e.g., a T3 link) with a link factor 136 of 500 to 10 Gbps (e.g., an OC-192 (Optical Carrier) link) with a link factor 136 of 1. In the embodiment of FIG. 2A, link factors 136 are inversely and exponentially related to bandwidths 134. In addition, a first subset of the set of factors 136 (e.g., the factors 136 corresponding to the 622 Mbps, 1 Gbps, 2.4 Gbps, and 10 Gbps bandwidths) causes a first subset of the set of costs 138 to favor respective bandwidths 134 over respective latencies 132 of respective links 122. A second subset of the set of factors 136 (e.g., the factors 136 corresponding to the 45 Mbps and 155 Mbps bandwidths) causes a second subset of the set of costs 138 to favor respective latencies 132 over respective bandwidths 134 of respective links 122. The first and the second subsets of the set of factors 136 are mutually exclusive (i.e., the first and the second subsets do not include any of the same factors 136 for a given bandwidth).

FIG. 2B is a table illustrating another embodiment of link factors for various links 122 for a network device 110 in one of two local area network (LAN) configurations. In a first type of LAN configuration (i.e., LAN1) where network device 110 is configured as a relay router that connects to another network device 110 configured as a relay router, link bandwidths include a 1 Gbps (e.g., a 1 Gbps Ethernet link) with a link factor 136 of 5 and a 10 Gbps (e.g., 10 Gbps Ethernet link) with a link factor 136 of 3. In a second type of LAN configuration (i.e., LAN2) where network device 110 is configured as a relay router that connects to another network device 110 configured as a collector router, link bandwidths include a 1 Gbps (e.g., a 1 Gbps Ethernet link) with a link factor 136 of 10 and a 10 Gbps (e.g., 10 Gbps Ethernet link) with a link factor 136 of 7.

FIG. 3 is a flow chart illustrating an embodiment of a method for transmitting data across a lowest cost communications path. The method of FIG. 3 will be described as being performed by one network device 110. Each network device 110 in network 100 performs the method of FIG. 3 in one embodiment.

In FIG. 3, cost unit 130 determines a link latency 132 for each link 122(1)-122(N) as indicated in a block 302. In one embodiment, cost unit 130 executes a ping command on each link 122(1)-122(N) to determine link latencies 132. In other embodiments, cost unit 130 determines latencies 132 from information received from other network devices 110 or by accessing information stored in network device 110.

Cost unit 130 determines a cost 138 for each link 122(1)-122(N) using latencies 132 and link factors 136 as indicated in a block 304. In one embodiment, cost unit 130 multiplies a respective latency 132 by a respective link factor 136 to determine a respective cost 138 for each respective link 122(1)-122(N). For example, assume that link 122(1) has a bandwidth 134 of 155 Mbps and a latency 132 of 24 ms and link 122(2) has a bandwidth 134 of 622 Mbps and a latency 132 of 230 ms. Using the respective link factors 136 shown in FIG. 2A, cost unit 130 determines a cost 138 for link 122(1) to be 2400 (i.e., 24 times 100) and a cost 138 for link 122(2) to be 2300 (i.e., 230 times 10). In this embodiment, one or more of link factors 136 may be equal to one to cause one or more of costs 138 to be equal to one or more of the respective latencies 132. In other embodiments, cost unit 130 uses another suitable function (e.g., a multiplicative or additive function) that relates a respective latency 132 and a respective link factor 136 to determine a respective cost 138 for each respective link 122(1)-122(N).

Cost unit 130 provides costs 138 to dynamic routing protocol 126 as indicated in a block 306. Dynamic routing protocol 126 receives costs 138 for each network device 110 and generates a converged routing table 128 that identifies the lowest cost paths from the network device 110 to other network devices 110 as indicated in a block 308.

Referring to FIG. 1C, dynamic routing protocol 126 analyzes paths 142(1)-142(P), where P is greater than or equal to one, between any number of arbitrary pairs of network devices 110($i$) and 110($j$), where i and j are any integer indexes that are not equal, to identify the costs of each possible path 142. Each possible path 142 includes one of links 122($i$)(2)-122($i$)(N) and one of 122($j$)(2)-122($j$)(N) and may include any number of additional links 122 connected to intermediate network devices 110 between network devices 110($i$) and 110($j$). Where network devices 110($i$) and 110($j$) are directly connected by a single link 122, the one of links 122($i$)-(2)-122($i$)(N) and the one of 122($j$)(2)-122($j$)(N) form the same link 122. Dynamic routing protocol 126 determines the cost for each path 142 to be equal to the sum of all links 122 in the path 142 in one embodiment. Dynamic routing protocol 126 identifies the lowest cost path 142 between network devices 110($i$) and 110($j$) and includes this lowest cost path in routing tables 128($i$) and 128($j$).

Network device 110 transmits data across a path 142 with the lowest cost as indicated in a block 310. In response to receiving data from link 122($i$)(1) that is destined for network device 110($j$), network device 110($i$) accesses routing table 128($i$) to determine a lowest cost path 142 to network device 110($j$) where the lowest cost path 142 includes one of links 122($i$)(2)-122($i$)(N). Network device 110($j$) transmits the received data to network device 110($j$) on the link 122($i$)(2)-122($i$)(N) that is part of the lowest cost path 142. The link 122($i$)(2)-122($i$)(N) may connect directly to network device 110($j$) or to an intermediate network device 110 between network device 110($i$) and network device 110($j$). Network device 110($j$) receives the data on a link 122($j$)(2)-122($j$)(N) that is part of the lowest cost path 142 and further transmits the data on a link 122($j$)(1).

In one embodiment, network devices 110 use the same latencies 132 and factors 136 for all links 122 to cause the cost of paths 142 to be the same in both directions between arbitrary network devices 110. By doing so, each pair of network devices 110 operates symmetrically by transferring data between the devices on the same path 142.

In other embodiments, different network devices 110 may use different latencies 132 or factors 136 to result in different lowest cost paths 142 being identified between a pair of network devices 110. Accordingly, a pair of network devices 110 may operate asymmetrically by transferring data between the devices on different paths 142 in this embodiment.

Network device 110 may include any suitable combination of hardware and software components. In one embodiment, dynamic routing protocol 126 and cost unit 130 each include a program that is stored in any suitable portable or non-portable storage medium (not shown) within or accessible to network device 110. The programs are accessible to and executable by a processor (not shown) in network device 110 to perform the functions of dynamic routing protocol 126 and cost unit 130 described above.

FIG. 4 is a flow chart illustrating an embodiment of a method for determining link factors 136 for communications links 122(1)-122(N) for a network device 110. In the method of FIG. 4, a range of cost values allowed by dynamic routing protocol 126 is determined as indicated in a block 402. A maximum link latency of all links 122(1)-122(N) is determined as indicated in a block 404.

Cost value bounds of dynamic routing protocol 126 are determined as indicated in a block 406. In one embodiment, the maximum latency determined in block 404 may be divided into the upper bound of cost values determined in block 402 to determine the upper cost value bound. The upper cost value bound may be determined in other ways in other embodiments.

Link factors 136 are determined for each link 122(1)-122(N) as indicated in a block 408. In one embodiment, link factors 136 are distributed exponentially across the set of bandwidths 134 of links 122(1)-122(N) within the cost value bounds so that the set of factors 136 has an inverse and exponential relationship with set of bandwidths 134. The set of factors 136 may be determined so that some of factors 136 cause costs 138 to favor higher bandwidths 134 over lower latencies 132 of links 122 and other factors 136 cause costs 138 to favor lower latencies 132 over higher bandwidths 134 of links 122. In other embodiments, link factors 136 may be distributed across the set of bandwidths 134 of links 122(1)-122(N) in other suitable ways.

The method of FIG. 4 may be performed automatically by a network device 110 or by an administrator of a network device 110. Where an administrator of a network device 110 performs the method of FIG. 4, the administrator may provide link factors 136 to network device 110 using any suitable interface.

The above embodiments may provide simple, straightforward, and consistent application of routing preferences in network devices 110 that scale across the full range of sizes and latencies of links 122.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A system comprising:
a first network device;
at least first and second links having first and second bandwidths, respectively, and first and second latencies, respectively, and connecting the first network device to at least a second network device; and
wherein the first network device is configured to determine a cost of the first link from the first latency and a first factor corresponding to the first bandwidth and a cost of the second link from the second latency and a second factor corresponding to the second bandwidth, wherein the first factor causes the cost of the first link to favor the first bandwidth over the first latency of the first link, wherein the second factor causes the cost of the second link to favor the second latency over the second bandwidth of the second link, and wherein the first network device is configured to provide the cost of the first link and the cost of the second link to a dynamic routing protocol configured to identify a lowest cost path between the first network device and a third network device using the cost of the first link and the cost of the second link, and wherein the first network device is configured to transmit data to the third network device using the lowest cost path.

2. The system of claim 1 wherein the first and the second factors are inversely related to the first and the second bandwidths, respectively.

3. The system of claim 1 wherein the first network device is configured to determine the first and the second latencies.

4. The system of claim 1 wherein the data includes latency sensitive data.

5. The system of claim 1 wherein the first network device is one of a router, a switch, a gateway, a firewall, and a bridge.

6. The system of claim 1 wherein the first and the second links are first and second optical links, respectively.

7. A method performed on a first network device, comprising:
determining a latency of each of a plurality of links between the first network device and one or more additional network devices in a network;
selecting a respective factor from a set of factors for each respective one of the plurality of links, each factor corresponding to a respective bandwidth of the respective link from a set of bandwidths;
determining a respective cost in a set of costs from the respective latency and the respective factor of the respective link, wherein the one of the respective factors causes a cost of a first link to favor a first bandwidth over a first latency of the first link and another respective factor causes a cost of a second link to favor a second latency over a second bandwidth of the second link;
providing the set of costs to a dynamic routing protocol that is configured to determine a set of lowest cost paths between the first network device and a set of other network devices in the network from the set of costs; and
transmitting data from the first network device to another network device in the network using one of the set of lowest cost paths.

8. The method of claim 7 wherein the respective factors are inversely related to the respective bandwidths of the plurality of links.

9. The method of claim 7 further comprising:
determining the respective cost using a function that relates the respective latency and the respective factor of the respective link.

10. The method of claim 7 wherein a first subset of the set of factors causes a first subset of the set of costs to favor respective bandwidths over respective latencies of respective links, wherein a second subset of the set of factors causes a second subset of the set of costs to favor respective latencies over respective bandwidths of respective links, and wherein the first and the second subsets of the set of factors are mutually exclusive.

11. The method of claim 7 wherein the data includes audio/video (AN) media.

12. The method of claim 7 wherein the first network device is a first one of a router, a switch, a gateway, a firewall, and a bridge.

13. A program product comprising:
a program executable by a processor for causing a network device to:
- determine a cost of a first link connected to the network device from a first latency of the first link with a first factor corresponding to a first bandwidth of the first link, the first factor causing the cost of the first link to favor the first bandwidth over the first latency of the first link;
- determine a cost of a second link connected to the network device from a second latency of the second link with a second factor corresponding to a second bandwidth of the second link, the second factor causing the cost of the second link to favor the second latency over the second bandwidth of the second link;
- provide the cost of the first link and the cost of the second link to a dynamic routing protocol that is configured to determine a set of lowest cost paths for transmitting data from the network device from the cost of the first link and the cost of the second link; and
- transmit the data on one of the set of lowest cost paths;

a non-transitory medium that stores the program so that the program is accessible to the processor.

14. The program product of claim 13 wherein the first and the second factors are inversely related to the first and the second bandwidths, respectively.

15. The program product of claim 13 wherein the program is executable by the processor for causing the network device to:
determine the first and the second latencies.

16. The program product of claim 13 wherein the network device is one of a router, a switch, a gateway, a firewall, and a bridge.

* * * * *

UNITED STATES PATENT AND TRADEMARK OFFICE
CERTIFICATE OF CORRECTION

| | | |
|---|---|---|
| PATENT NO. | : 7,907,530 B2 | Page 1 of 1 |
| APPLICATION NO. | : 11/917649 | |
| DATED | : March 15, 2011 | |
| INVENTOR(S) | : Stephen F. Froelich et al. | |

It is certified that error appears in the above-identified patent and that said Letters Patent is hereby corrected as shown below:

In column 6, line 64, in Claim 11, delete "(AN)" and insert -- (A/V) --, therefor.

Signed and Sealed this
Fourteenth Day of June, 2011

David J. Kappos
*Director of the United States Patent and Trademark Office*